United States Patent [19]

Harris

[11] Patent Number: 4,954,719
[45] Date of Patent: Sep. 4, 1990

[54] SHEET THICKNESS GAUGING METHOD AND SYSTEM WITH AUTO CALIBRATION

[75] Inventor: Holton E. Harris, Westport, Conn.

[73] Assignee: Harrel, Inc., East Norwalk, Conn.

[21] Appl. No.: 241,486

[22] Filed: Sep. 7, 1988

[51] Int. Cl.⁵ .......................................... G01N 21/86
[52] U.S. Cl. ................................. 250/560; 250/359.1;
250/559; 378/55; 378/89; 356/386; 33/701;
264/40.1
[58] Field of Search ...................... 378/55, 56, 89, 58;
250/359.1, 360.1, 559, 560, 561, 563; 425/140;
264/40.1; 73/159; 33/701; 356/386, 387, 429

[56] References Cited

U.S. PATENT DOCUMENTS

| 3,307,215 | 3/1967 | Gerhard et al. | |
|---|---|---|---|
| 3,518,431 | 6/1970 | Rowe | 378/55 |
| 3,840,302 | 10/1974 | Brunton et al. | 356/386 |
| 4,393,313 | 7/1983 | Calkins et al. | 356/386 |
| 4,454,084 | 6/1984 | Smith et al. | |
| 4,542,297 | 9/1985 | Hold | |
| 4,559,452 | 12/1985 | Igaki et al. | 356/386 |
| 4,734,922 | 3/1988 | Harris | |

OTHER PUBLICATIONS

Harrel, Inc.'s Technical Data Sheet, TDS-250 entitled "TG Series Nuclear Thickness Gauges".
Harrel, Inc.'s Technical Data Sheet, TDS-245B entitled "SC-600 Series Digipanel Sheet Thickness Controller".
Holton E. Harris, "Computerized Control of Sheet Thickness Makes Extrusion More Profitable," Plastics Design and Processing, Feb. 1975.

Primary Examiner—Carolyn E. Fields
Assistant Examiner—David P. Porta
Attorney, Agent, or Firm—Brumbaugh, Graves, Donohue & Raymond

[57] ABSTRACT

A sheet thickness gauging system locates sheet edges to measure sheet width and to calibrate the gauging procedure to take into account neck-in or lateral shifting of the sheet. Initially, and at regular intervals during extrusion, the controller, motor, and motor control that cooperate to control a nuclear gauge's movement and measurement on a traverse across the path of movement of the sheet, rapidly move the gauge to a first position near a first edge of the sheet. From that position to the edge the gauge steps in small steps until a substantial reduction in apparent thickness is detected, signifying the location of the edge. A limit to the regular transverse gauging movement of the gauge is set just inward of the detected first edge. The gauge is then moved rapidly across the sheet to a second position near the other edge of the sheet, where the system proceeds similarly to detect the second edge and set a second limit. Regular gauging then proceeds, across the sheet from one limit to other.

13 Claims, 2 Drawing Sheets

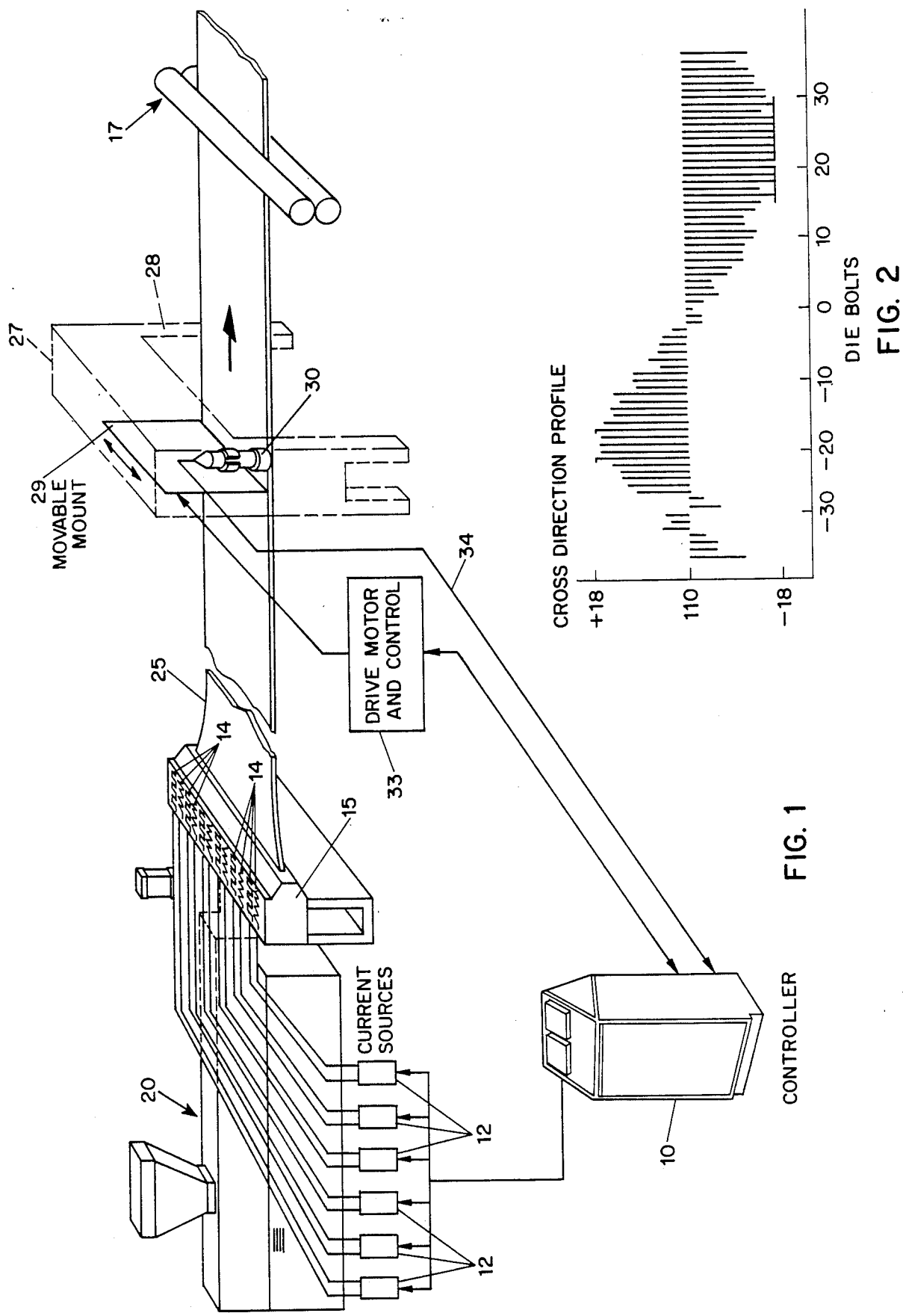

SHEET THICKNESS GAUGING METHOD AND SYSTEM WITH AUTO CALIBRATION

BACKGROUND OF THE INVENTION

This invention relates to a sheet width determining apparatus and to a width determining apparatus used with a thickness gauging method and system with automatic calibration for sheet width variation. More particularly, the invention relates to methods and systems in which the edges of a sheet in transit past a gauging system are regularly and systematically located by the gauging system, to establish limits of gauge movement transverse to the direction of movement of the sheet and to enable resetting of measurement locations across the sheet, or to measure the width of the sheet being extruded.

Methods and systems for measuring the thickness of sheet are known in the art such that a gauge traverses the moving sheet to measure sheet thickness as the sheet moves past the thickness measurement station. The gauge either continuously measures thickness as it moves across the sheet or it makes measurements only at predetermined locations across the sheet. One system described for use with a plastic sheet extruder is set forth in the inventor's U.S. Pat. No. 4,734,922 entitled Nuclear Gauge Traverse, which is assigned to the assignee of the present invention. The known systems typically use a nuclear gauge to determine the profile of thickness across the width of the plastic sheet being extruded. The nuclear thickness gauge is either a gamma backscatter type or a Beta gauge. It is placed on a travelling mount, which moves the gauge back and forth across the width of the sheet. Backscatter gauges are located entirely on one side of the sheet. Beta gauges are usually of the transmission type, whereby the source is located on one side of the sheet, and a receiver is located on the other side. In either case, the signal arriving at the receiver is a measure of the basis weight, or mass per unit area, of the sheet at the point where measurement is occurring. Since the density is known, this measurement can be used as a measure of the thickness of the sheet. Electronics associated with the gauge give an output indication of the thickness in commercially available gauges.

Conventionally, the traverse, which is to say the travelling mount, moves in one direction across the sheet, until it strikes a limit switch. This switch reverses the drive motor, so that the traverse goes back across the sheet in the other direction, until it strikes a second limit switch. Again the drive motor reverses direction, and the gauge goes back and forth across the sheet in this manner. As described in the inventor's above-mentioned patent, the sheet thickness information derived by these thickness gauges is used to make corrections at the die, where the sheet emerges from the extruder. Die bolt adjustments, whereby die bolts regularly spaced along the die opening are selectively adjusted or heated, to alter the opening size in the sheet thickness direction, and die heaters that vary the temperature of the die lips to control the thickness of the emerging sheet by altering viscosity, are two means by which sheet thickness measurement feedback information corrects the sheet thickness profile across the width of the sheet.

In the traverse of the inventor's aforementioned patent, the speed with which the thickness profile of the sheet can be established is improved. Whereas previously, the slow response time of nuclear gauges required a slow movement of the gauge across the sheet, the inventor reduced the time necessary to develop a profile of the thickness across the sheet by recognizing that the locations of interest were those locations across the sheet corresponding to the lateral spacing of the die bolts or die heaters that adjusted sheet thickness there. By rapidly moving from one measurement location to the next, pausing long enough to make a thickness measurement using the nuclear gauge, and then rapidly moving to the next location in "jackrabbit" fashion, the wasted time between measurements was held to a minimum. Most of the time spent during a traverse was spent at the locations where measuring the sheet thickness was to occur.

There remained, however, a further problem in that it was necessary to calibrate this or earlier traversing gauges to account for the width of the particular sheet being gauged. Because the sheet width of the sheet being extruded does not remain constant throughout the extrusion process, the system had to be calibrated anew from time to time to assure that the gauge was traversing nearly all of the sheet, but would not move beyond its edges. The need for calibration and recalibration is apparent from, for example, the problem of "neck-in" experienced during the extrusion of plastic sheet. A plastic sheet extruded through a die with a 30 inch wide slot, for example, will be 30 inches wide at the die, but there is a stretching effect between the lips of the die and the chill rolls that the plastic sheet typically is extruded onto. The sheet is stretched like a rubberband as it exits the die, and like a rubberband, when it stretches, it contracts in width. A 30 inch wide sheet will typically be 27-28 inches wide at the chill rolls. Sometimes the sheet is extruded downward into a water bath, and then the neck-in is even greater. A 76 inch wide sheet may be stretched down to 67 inches wide.

Calibration of a sheet gauging system should take into account the neck-in of the sheet and its effect on the location across the sheet of those places where thickness is directly affected by manipulation of correspondingly located die bolts or die heaters. The starting point for such calibration is location of the edges of the sheet. Moreover, because the sheet in certain extrusion processes varies in its width from time to time, for example when a water bath water level changes, calibration should be repeated throughout the extrusion process.

The width reduction also affects the positions of the test locations that were aligned with die bolts or heaters as the sheet emerged at the die. These test locations can be corrected manually, but it is a time consuming endeavor. Regularly manually resetting limits and gauging locations, then, is not an attractive prospect when economical operation and high rates of production are objectives.

Aside from the effect of sheet width variation on thickness gauging, width measurement at regular intervals can be used to determine that sheet width is within tolerance. Variations from desired width may call for corrective procedures to bring the width back to within acceptable tolerance.

BRIEF SUMMARY OF THE INVENTION

In accordance with this invention location of a sheet edge by a thickness gauging method and system is accomplished by rapidly moving a gauge to a first position near one edge of the sheet, and then slowly proceeding towards the edge while gauging the sheet thickness, until the thickness measurement drops to some predetermined and substantially reduced thickness, such as half the nominal thickness. At that point, the location of the gauge is noted, typically by a microprocessor based controller noting the value from a position-sensing transducer, and a gauge movement limit is set a known amount inward from the sensed edge. Preferably the limit is set at a location that is the first location on the sheet where thickness was directly affected by a die bolt or heater as the sheet emerged from the die.

Most typically, after the first limit is set, in the above manner, the motor controller causes the traverse to carry the gauge at high speed towards the remaining edge of the extruded sheet, stopping it short of where that edge can be expected to occur. Again, the gauge is then moved very slowly towards the edge until the thickness measurement falls off significantly. Once more, the limit of gauge movement is set slightly inward of the edge, preferably at a location understood to correspond to the location on the sheet that was in alignment with a die bolt or die heater nearest that edge when the sheet emerged. The value of width thus determined can be noted for simply assuring that the appropriate sheet width is being achieved, or it can be employed as a control variable in an extrusion controller, for example to reduce neck-in by reducing take-off roll speed.

In a traverse of the kind described in the inventor's aforementioned patent, but employing the present invention, the manner of slowly progressing towards the edge during the edge location procedure is actually a number of tiny rapid steps between measurements. The tiny steps towards the edge are steps considerably smaller in size than the distance between normal thickness measurements that occur during the regular gauging at locations across the width of the sheet. Using a microprocessor based controller, calibration involving edge location in the above manner can be effected at regular timed intervals throughout the course of an extrusion operation. It will be recognized that the technique set forth above can correct gauge movement to account for lateral shifts of the sheet as well as width variations.

In practice, then, the extruder operator simply pushes a button for automatic calibration as soon as he has set up. Initial calibration gets the system started correctly. After that, the system calibrates itself periodically, typically once an hour, to make sure that the calibration remains accurate with width changes and lateral position changes of the sheet.

BRIEF DESCRIPTION OF THE DRAWINGS

The above and further objects and advantages of the invention will be better understood from the following detailed description of a preferred embodiment taken in consideration with the accompanying drawings, in which:

FIG. 1 is a diagrammatic illustration of an extruder thickness control system of the kind to which this invention relates and shows a digital controller for effecting rapid traversing of a gauge across an extruded sheet;

FIG. 2 is an exemplary display graphically illustrating a cross sectional profile available from the controller of FIG. 1;

DETAILED DESCRIPTION OF THE PREFERRED EMBODIMENT

Figure 3:
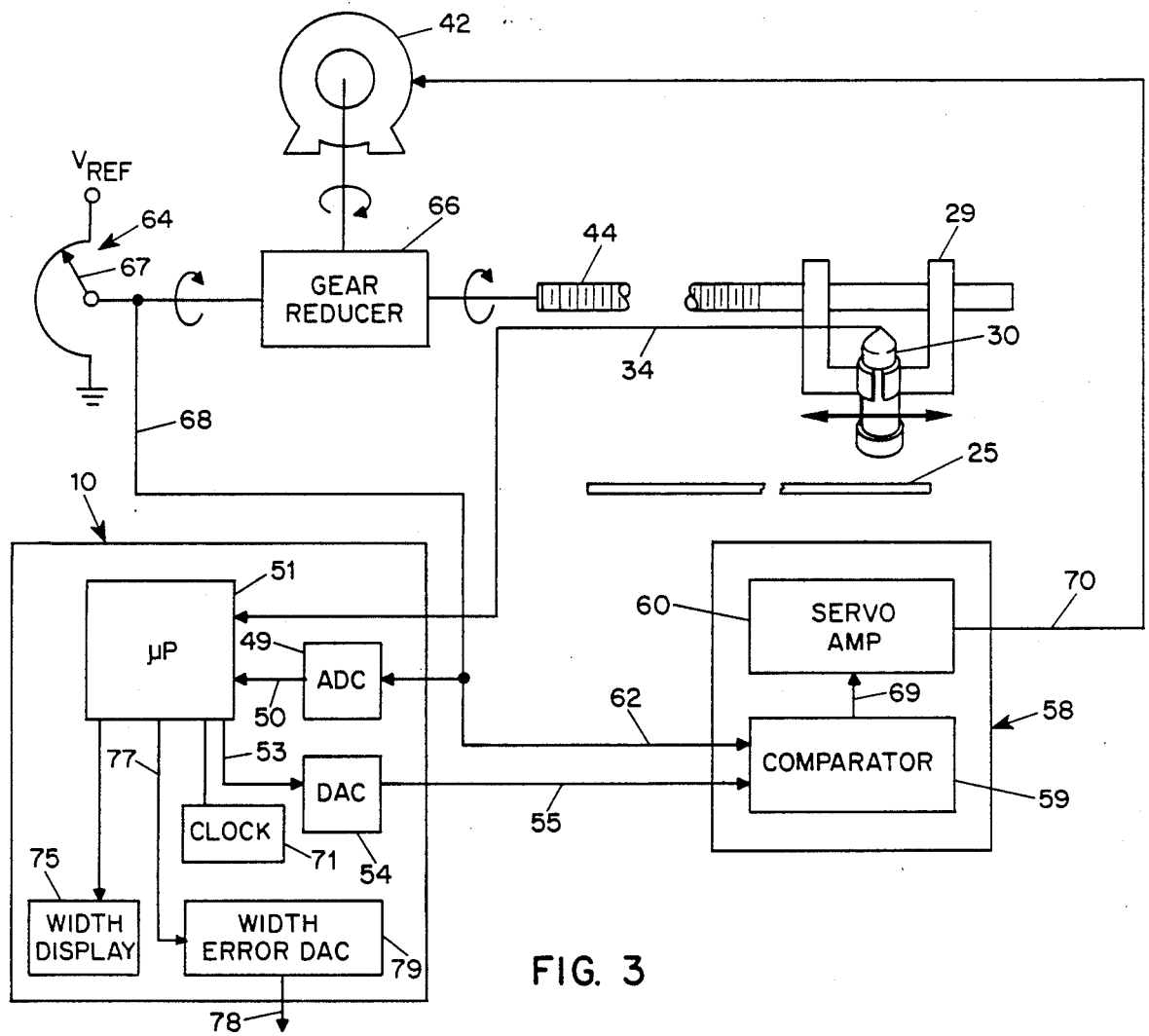
FIG. 3 is a schematic illustration of the self calibrating gauge traverse control system features according to this invention used in the system of FIG. 1 and shows motor control provisions cooperating with a lead screw driven traverse and gauge.

In FIG. 1 is shown a system for extruded sheet thickness control of a kind to which the invention can be applied. FIG. 1 is similar to FIG. 1 of the inventor's U.S. Pat. No. 4,734,922. A digital controller 10, (for example a Harrel DIGIPANEL sheet thickness controller of the SC-600 series) is connected in controlling relation to a series of current sources or contactors 12 that supply current to heaters 14 at the die 15 of an extruder 20. An extruded sheet 25 passes a traverse 27 on its way to chill rolls 17. The sheet 25 can be seen to have necked-in to a reduced width at the traverse 27. The traverse comprises a stand 28 and a moveable gauge mount 29, supported for transverse movement across the sheet 25. The gauge mount 29 supports a nuclear gauge 30, for example, a gauge of the gamma backscatter type like the Harrel TG601 or TG602 thickness gauges. The traverse 27 can be a traverse of the kind offered by Harrel, Incorporated under the designation TM 600. The mount 29 is mechanically driven by the motor of a motor and control combination 33. An output from the drive motor and control 33 provides a gauge position indication to the controller 10. A gauge output 34 supplies a thickness indication to the controller.

The drive motor of the motor and control 33 of FIG. 1 can be a reversible motor. The digital controller 10 is microprocessor based, is programmable, and has memory. The output 34 from the gauge is delivered to the controller 10, which then compares measured thickness with stored, preset desired thickness, and adjusts the relevant heater 14 accordingly. In the die 15 of the extruder 20, it is heat delivered to the die lips that effects changes in thickness through viscosity alterations at the particular location, but it will be understood that the similar delivery of heat to bolts along the die of a known, heated bolt die thickness control system will operate in like manner.

FIG. 2 is an actual transverse thickness profile developed using a gauge 30 in cooperation with a controller 10 and illustrates the information that the gauge provides. Deviation from the chosen thickness, shown as 110 on the Y axis, is plotted at points corresponding to more than 60 locations of die bolts or heaters 14 across the sheet, represented along the X axis. Utilizing this information to supply the necessary heat to the bolts or heaters 14 will, it can be seen, provide accurate thickness control on a continuing basis. Rapidly accelerating the moveable mount 29 to its maximum speed via the drive motor means 33 between measuring points significantly enhances this control, as is described in the inventor's aforementioned patent. At each measurement location, during the regular gauging of the sheet, the gauge stops (or slows very substantially) to provide the requisite time for gauging with a nuclear gauge.

In the preferred embodiment of the invention shown diagrammatically in FIG. 3, a reversible servo motor 42 (of the drive motor and control 33 of FIG. 1) drives a lead screw 44 that carries the movable mount or carriage 29 bearing the nuclear gauge 30. The output signal from the nuclear gauge 30 at the line 34 is representative of the thickness of an extruded plastic sheet 25. The output in this case is a digital signal from the gauge's electronics. It is fed to a microprocessor 51 of the controller 10. The microprocessor 51, which includes the memory necessary for appropriate programming, provides a digital output signal 53 to a digital to analog converter 54 that is also a part of the controller 10. The digital to analog converter 54 produces an analog output corresponding to the digital input 53 and supplies that as an output from the controller 10 on a line 55. A motor controller 58, for example the Harrel RD 206 and part of the drive motor and control of FIG. 1, has a comparator section 59 and a servo amplifier 60. The analog output on line 55 from the controller 10 is supplied to the comparator section 59 of the motor controller 58 for comparison with a further analog input on a line 62 from a potentiometer 64. This is the gauge position-sensing transducer. The potentiometer 64 is driven in common with the lead screw 44 by the servo motor 42, for example via a gear reducer 66. The potential at the potentiometer wiper 67 and a line 68 leading from the potentiometer is a proportion of a reference voltage $V_{ref}$. That proportion is indicative of the position of the gauge 47. An output 69 from the comparator 59 to the servo amplifier 60 is the difference between the analog output on line 55, from the controller 52, and the analog position representative output on the line 62, from the potentiometer 64. This difference potential varies in sign and magnitude as a function of the inputs to the comparator 59. The servo amplifier 60 amplifies and presents the comparator output 69 on a line 70 as controlling input to the servo motor 42.

In operation, the microprocessor 51 provides an output representative of a desired gauge position on the line 53 to the digital to analog converter 54. The digital to analog converter outputs the desired position indication in analog form to the comparator 59 of the motor controller 58. The comparator compares the desired position represented as the output on the line 55 with the actual position represented by the voltage on the line 62. The difference is supplied, via the servo amplifier 60, to the motor 42 to bring the voltages on the two inputs to the comparator to 0.

Figure 4:
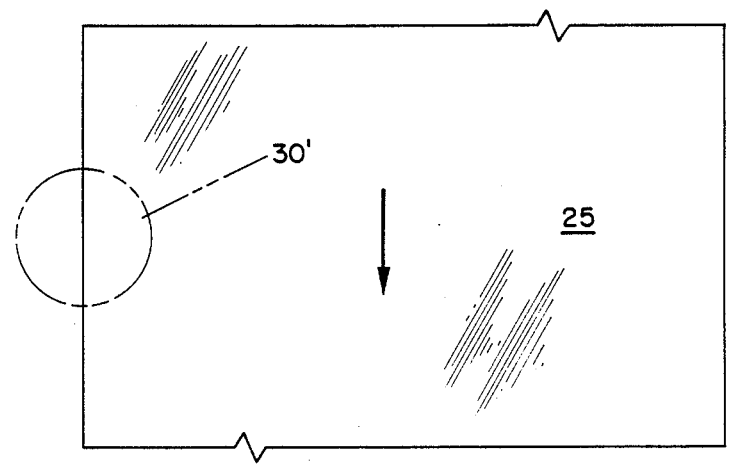
FIG. 4 is a diagrammatic illustration of the viewing area of the nuclear gauge of FIGS. 1 and 3 at the edge of an extruded plastic sheet.

In the system's calibration mode, after an initial setting into the microprocessor of the unit of width represented by each unit of voltage, to enable the microprocessor to correctly determine the location of the gauge, the microprocessor initiates a calibration routine that sets limits of the gauge's lateral movement to near the edge of the sheet 25, but inward of the edges. The operator puts into the controller 10 the nominal width of the sheet 25. During calibration, the microprocessor, by appropriate output on the line 53, signals the motor 42 to move the traverse first at high speed towards a location 2" or 3" in from the nominal edge location of the sheet 25 being extruded. When the input to the microprocessor at a line 50 from an analog to digital converter 49, which is connected to the analog actual position signal on the line 68, is such that the microprocessor recognizes that the gauge 30 is at the location chosen (i.e., 2" or 3" in from the nominal edge position), the microprocessor then instructs the gauge to move towards the edge very slowly. This can be done in tiny jumps to closely spaced gauging points, much closer than typical gauging locations used regularly. The distance between these closely spaced points is dictated by the microprocessor 51. The gauge stops or at least slows very substantially, at each of these. Alternatively, very slow continuous movement of the gauge during constant thickness gauging can be used. As the gauge 30 comes to the edge of the sheet 25 as depicted in FIG. 4, the thickness output at the line 45 drops off rapidly. In FIG. 4, the circle 30' indicates diagrammatically the area of inspection of the gauge 30, which is to say the area that it irradiates. When the indicated thickness has dropped a predetermined substantial amount to, say, half of its nominal value, because a substantial part of the irradiating beam is not impinging the sheet as shown in FIG. 4, the microprocessor sets a limit of gauge movement slightly inward from this location for limiting subsequent gauge movement during subsequent regular gauging of sheet thickness at positions across the width of the sheet. The determination that the apparent thickness has dropped the predetermined amount is made by the microprocessor comparing the gauge output on line 24 with the prescribed measurement in its memory. Pursuant to its program, it then sets the limit into memory for subsequent comparison with the positional indication on line 50.

Now the microprocessor repeats the routine by directing the motor 42 to move the gauge traverse and gauge rapidly to a distance just inward of the other edge of the sheet 25. Once that location is reached, the microprocessor again moves the gauge in tiny steps, or very slowly, until the output from the gauge indicates half the desired thickness. The further lateral edge has now been recognized, and the microprocessor calculates a point slightly inward of the edge and establishes this as a limit in the regular gauging of sheet thickness that follows. Until the next calibration, operating in its regular gauging mode, the gauge traverses the sheet, stopping at the limits. This can be accomplished by the microprocessor 51 comparing the stored limit value with the actual position value and when they are equal applying the next desired position value (in the reverse direction) to the comparator via the DAC 54, causing the motor 42 to reverse and again move the gauge to bring the comparator 59 output back toward zero. Preferably the inwardly located limit points correspond to the outermost locations on the sheet that, at the die, align with heaters 14 or die adjustment bolts. Those locations that correspond with bolt or heater locations on a necked-in sheet can be stored based on empirical data or can be calculated based on prior observations of the manner in which sheet width reduction affects these locations.

Throughout the course of an extrusion run, the inventive edge location process is repeated. In the preferred arrangement this is accomplished simply on a regular basis utilizing an internal clock 71 of the controller 52, but the recurrence of the calibration can as easily be made dependent on a given number of gauge traverses made in the regular thickness measuring routine or mode. Lateral shifting of the sheet 25 will also be detected and accounted for by the edge location method and system described.

It will be apparent that, each time the two sheet edges have been located, the controller 10 has sufficient information to determine the sheet width arithmetically, i.e. by subtracting the digitally represented value of the potentiometer voltage at line 68 for the one edge location from that representing the other edge location. This width value can of course be displayed as indicated generally at display 75. The microprocessor can compare the desired width, previously set manually as mentioned above, with the calculated width, to develop an error signal at line 77, by subtraction, or a known more complex function, to develop a control output, at line 78, by a DAC 79, for example, to use in control of the extrusion process, such as by varying the speed of the take off rolls to alter neck-in affecting the width. If desired, the width and thickness values derived in accordance with this invention can be used with the velocity of the extruded product in the calculation of volume per unit time being extruded to control the density of foam sheet extrusion as in the inventor's U.S. Pat. No. 4,613,471, assigned to the assignee of the present invention.

Whereas specific preferred features of a preferred embodiment have been described above, it will be recognized by those skilled in the art that other modifications and alterations can be made without departure from the spirit and scope of the invention, which invention is described in the appended claims.

I claim:

1. In a method of gauging extruded sheet of the kind that includes the movement of a gauge transversely across the extruded sheet during regular thickness gauging of the sheet, the improved calibration for sheet width comprising the steps of:
    (a) moving the gauge to a first position near a first edge of the sheet,
    (b) moving the gauge more slowly towards the first edge,
    (c) monitoring the sheet thickness with the gauge during the progress of the gauge towards the first edge,
    (d) determining when apparent thickness measurement has dropped a predetermined substantial amount signifying the first edge of the sheet being located in the area of inspection of the gauge, and
    (e) setting a limit to the regular thickness gauging movement of the gauge across the sheet at a location proximate the location where the gauge resides when the apparent thickness measurement has dropped the predetermined substantial amount that signifies the sheet edge.

2. The method of gauging extruded sheet according to claim 1, further comprising:
    (a) moving the gauge to a second position near a second edge of the sheet,
    (b) moving the gauge towards the second edge more slowly than the movement towards the second position,
    (c) monitoring the sheet thickness with the gauge during the progress of the gauge towards the second edge,
    (d) determining when the apparent thickness has dropped another predetermined substantial amount signifying the second edge of the sheet being located in the area of inspection of the gauge as the gauge progresses towards the second edge, and
    (e) setting a second limit to the regular thickness gauging movement of the gauge across the sheet at a location proximate the location where the gauge resides when the apparent thickness measurement has dropped the second predetermined substantial amount that signifies the second sheet edge.

3. The method according to claim 2 wherein, in the steps of determining when the apparent thickness has dropped, the predetermined substantial amounts the apparent thickness measurements drop that signify the first and second edges of the sheet both being the equivalent of half the thickness of the sheet.

4. The method according to claim 1 wherein the step of moving the gauge more slowly comprises moving the gauge in steps between spaced measurement points from the first position to the first edge, and the step of monitoring the sheet thickness comprises measuring the sheet thickness at the spaced measurement points.

5. The method according to claim 2 further comprising the step of gauging the sheet thickness regularly across the width of the sheet including moving the gauge transversely of the sheet extrusion direction between thickness measurement locations, at least substantially slowing the gauge at each of the measurement locations and measuring sheet thickness there, the calibration method including a least substantially slowing the gauge at the first position, moving the gauge in steps between measurement points that are between the first position and the first edge and that are more closely spaced than said measurement locations, at least, slowing the gauge and measuring the sheet thickness at each of the more closely spaced measurement points until the first mentioned predetermined substantial amount of drop in the apparent thickness is detected to signify the first edge, then after the step of setting the first mentioned limit, the step of moving the gauge to the second location comprising moving the gauge past the measurement locations to the second location, at least slowing the gauge at the second position, moving the gauge in steps between measurement points that are between the second position and the second edge and that are more closely spaced than said measurement locations, at least slowing the gauge and measuring the sheet thickness at each of the more closely spaced points between the second position and second edge until the second predetermined substantial amount of drop in the apparent thickness is detected to signify the second edge, then, after the step of setting the second limit, commencing regular thickness gauging at measurement locations between the first and second limits.

6. In a method of measuring extruded sheet of the kind that includes the movement of a gauge transversely across the extruded sheet during regular thickness gauging of the sheet, the improved calibration for sheet width measurement comprising the steps of:
    (a) moving the gauge to a first position near a first edge of the sheet,
    (b) moving the gauge more slowly towards the first edge,
    (c) monitoring the sheet thickness with the gauge during the progress of the gauge towards the first edge,
    (d) determining when apparent thickness measurement has dropped a predetermined substantial amount signifying the first edge of the sheet being located in the area of inspection of the gauge,
    (e) developing a signal indicative of the position of the first edge when the apparent thickness measurement has dropped the predetermined substantial amount that signifies the sheet edge,
    (f) moving the gauge to a second position near a second edge of the sheet,
    (g) moving the gauge towards the second edge more slowly than the movement towards the second position,
    (h) monitoring the sheet thickness with the gauge during the progress of the gauge towards the second edge,
    (i) determining when the apparent thickness has dropped another predetermined substantial amount signifying the second edge of the sheet being located in the area of inspection of the gauge as the gauge progresses towards the second edge, (j) developing a signal indicative of the position of the second edge when the apparent thickness measurement has dropped the second predetermined substantial amount that signifies the second sheet edge, and (k) calculating the sheet width using the signals indicative of the positions of the first and second edges.

7. The method of measuring according to claim 6 further comprising the steps of comparing the calculated sheet width with a desired sheet width and developing a control output based on the comparison.

8. In a system for measuring the thickness of extruded product downstream of an extruder die, the combination including a gauge, means for mounting the gauge for movement transversely of the extruded product, motor means connected to the means for mounting to impart transverse movement to the means for mounting, controller means for controlling movement of the motor means in a calibration mode to cause the motor means to move the gauge at a first velocity to a first position near a first edge of the product and to cause movement of the gauge more slowly towards the first edge, said gauge measuring the thickness intermediate the first position and the first edge and providing a measured thickness indication, said controller means being responsive to the measured thickness indication from the gauge indicating an apparent thickness decrease of a predetermined substantial amount to set a limit to regular thickness gauging movement of the gauge at a location proximate the location where the gauge resides when the apparent thickness measurement has dropped the predetermined substantial amount that signifies the sheet edge.

9. The system according to claim 8, wherein said controller means comprises means for causing stepping of the motor means to move the gauge a series of steps between measurement points from the first position to the first edge, the controller means further comprising means for receiving from the activated gauge, at the measurement points, thickness indications, until the apparent thickness decrease of a predetermined substantial amount is detected by the controller means.

10. The system according to claim 8 wherein the controller means comprises means for causing a reverse movement of the gauge to a second position near a second edge of the product after setting of the limit, and for causing movement of the gauge via the motor means more slowly than the reverse movement towards the second edge, the controller means further comprising means for receiving, from the gauge, indications of thickness intermediate the second position and the second edge, and said controller means being responsive to the gauge indications indicating an apparent thickness decrease of a second predetermined substantial amount as the gauge moves to the second edge for setting a second limit to the regular gauging movement of the gauge at a location proximate the location where the gauge resides when the apparent thickness measurement has dropped the second predetermined substantial amount that signifies the second sheet edge.

11. The system according to claim 8 further comprising means for establishing times during which continued regular gauging of an extruded product is interrupted and at which calibration is repeated to automatically establish edge location.

12. In a system for measuring extruded product downstream of an extruder die, the combination including a thickness gauge, means for mounting the gauge for movement transversely of the extruded product, motor means connected to the means for mounting to impart transverse movement to the means for mounting, controller means for controlling movement of the motor means in a calibration mode to cause the motor means to move the gauge to a first position near a first edge of the product and to cause movement of the gauge more slowly towards the first edge, said gauge measuring the thickness intermediate the first position and the first edge and providing a thickness indication, said controller means being responsive to the measured thickness indication from the gauge indicating an apparent thickness decrease of a predetermined substantial amount to develop a signal indicative of the position of the first edge when the apparent thickness measurement has dropped the predetermined substantial amount that signifies the sheet edge, the controller means comprising means for causing reverse movement of the gauge to a second position near a second edge of the product after setting of the limit, and for causing movement of the gauge via the motor means more slowly towards the second edge, the controller means further comprising means for receiving, from the gauge, indications of thickness intermediate the second position and the second edge, and said controller means being responsive to the gauge indications indicating an apparent thickness decrease of a second predetermined substantial amount as the gauge moves to the second edge to develop a signal indicative of the position of the second edge when the apparent thickness measurement has dropped the second predetermined substantial amount that signifies the second sheet edge, and the controller means having means for calculating the width of the product from the signals indicative of the positions of the first and second edges.

13. The system according to claim 12 wherein the controller means is comprising means to compare calculated sheet width with a desired sheet width, and further comprising means for developing a control output based on the comparison.

* * * * *